(12) United States Patent
Suzuki

(10) Patent No.: US 11,750,067 B2
(45) Date of Patent: Sep. 5, 2023

(54) ROTARY MACHINE SYSTEM

(71) Applicant: MEIDENSHA CORPORATION, Tokyo (JP)

(72) Inventor: Shota Suzuki, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/793,229

(22) PCT Filed: Sep. 14, 2020

(86) PCT No.: PCT/JP2020/034649
§ 371 (c)(1),
(2) Date: Jul. 15, 2022

(87) PCT Pub. No.: WO2021/145022
PCT Pub. Date: Jul. 22, 2021

(65) Prior Publication Data
US 2023/0060595 A1 Mar. 2, 2023

(30) Foreign Application Priority Data

Jan. 16, 2020 (JP) .................. 2020-004886
Jan. 31, 2020 (JP) .................. 2020-015457

(51) Int. Cl.
*H02K 9/193* (2006.01)
*H02K 5/20* (2006.01)
(Continued)

(52) U.S. Cl.
CPC ............. *H02K 9/193* (2013.01); *H02K 5/203* (2021.01); *H02K 11/215* (2016.01); *H02K 11/33* (2016.01)

(58) Field of Classification Search
CPC ...... H02K 9/193; H02K 5/203; H02K 11/215; H02K 11/33
(Continued)

(56) References Cited

U.S. PATENT DOCUMENTS

2011/0116948 A1* 5/2011 Yi .................. H02K 15/022
29/596
2014/0125207 A1* 5/2014 Kim .................. H02K 11/042
310/68 B (Continued)

FOREIGN PATENT DOCUMENTS

CN 105515281 A 4/2016
JP 2000-209810 A 7/2000
(Continued)

*Primary Examiner* — John K Kim
(74) *Attorney, Agent, or Firm* — Foley & Lardner LLP

(57) ABSTRACT

Installation workability of a motor system 1 is improved and occurrence of a communication error between an inverter 50 and an electric portion 83 of an electric oil pump 80 due to entry of noise can be suppressed.
A motor portion 2 and the inverter 50 are adjacent to each other in a motor axial direction, at an adjacent portion, a wall of a casing of the inverter 50 on an arrow A direction side and a wall of a casing of the motor portion 2 on an arrow B direction side are shared as a barrier 3b made of the same member, and in a position that a pump portion 81 side of the electric oil pump 80 including a pump portion 81, an internal motor 82, and an electric portion 83 arranged in the motor axial direction faces the arrow A direction side, the electric oil pump 80 is disposed in the casing of the motor portion 2 and the inverter 50.

6 Claims, 10 Drawing Sheets

(51) Int. Cl.
*H02K 11/215* (2016.01)
*H02K 11/33* (2016.01)

(58) Field of Classification Search
USPC .......................................... 310/54, 68 B, 68 R
See application file for complete search history.

(56) References Cited

U.S. PATENT DOCUMENTS

| | | |
|---|---|---|
| 2016/0254719 A1 | 9/2016 | Pondelek et al. |
| 2018/0254685 A1 | 9/2018 | Seki |
| 2018/0287452 A1* | 10/2018 | Kim ....................... H02K 5/203 |
| 2019/0123619 A1 | 4/2019 | Sakurada |
| 2019/0226486 A1 | 7/2019 | Iizuka et al. |
| 2019/0376511 A1 | 12/2019 | Kobayashi et al. |
| 2020/0106344 A1* | 4/2020 | Okuhata ................ H02K 9/193 |
| 2021/0129660 A1* | 5/2021 | Bradfield ............... H02K 7/116 |
| 2023/0060595 A1* | 3/2023 | Suzuki ................. H02K 11/215 |

FOREIGN PATENT DOCUMENTS

| | | |
|---|---|---|
| JP | 2011-004488 A | 1/2011 |
| JP | 2012-090412 A | 5/2012 |
| JP | 2014-064386 A | 4/2014 |
| JP | 2018-148669 A | 9/2018 |
| WO | WO-2018/159480 A1 | 9/2018 |

\* cited by examiner

ROTARY MACHINE SYSTEM

TECHNICAL FIELD

The present invention relates to a rotary machine system.

BACKGROUND ART

Conventionally, a rotary machine system including a rotary machine, an inverter that supplies electric power to the rotary machine, and an oil pump that sucks and discharges oil circulated in the rotary machine is known.

For example, Patent Literature 1 discloses a motor system as a rotary machine system including a motor as a rotary machine, an inverter that shares electric power with the motor, and an oil pump that sucks and discharges cooling oil circulated in the motor. The inverter and the oil pump are disposed at positions away from the motor. The oil discharged from the oil pump is supplied into the motor through an oil supply pipe connected to the motor. The oil circulates in the motor to cool the motor, is then discharged from the motor, and is sucked into the oil pump through an oil discharge pipe connected to the motor.

CITATION LIST

Patent Literature

Patent Literature 1: JP 2014-64386 A

SUMMARY OF INVENTION

Technical Problem

In the motor system described in Patent Literature 1, since it is necessary to connect the oil supply pipe and the oil discharge pipe to the motor and the oil pump, there is a problem that it takes time and effort to install the motor system. Furthermore, since it is necessary to draw a communication line for performing communication between the inverter and an electric portion of the oil pump outside the motor, there is a problem that a communication error due to entry of noise is likely to occur.

The present invention has been made in view of the above background, and an object thereof is to provide a rotary machine system capable of improving installation workability of the rotary machine system and suppressing occurrence of a communication error between an inverter and an electric portion of an oil pump due to entry of noise.

Solution to Problem

An aspect of the present invention is a rotary machine system including: a rotary machine; an inverter that supplies electric power to the rotary machine; and an oil pump that sucks and discharges oil circulated in the rotary machine, in which the rotary machine and the inverter are adjacent to each other in a rotary machine axial direction, at an adjacent portion, a wall of a casing of the inverter on one side in a rotary machine axial direction and a wall of a casing of the rotary machine on an other side in the rotary machine axial direction are shared as a same member, and in a position that a pump portion side in a motor axis line direction of the oil pump including a pump portion, a motor portion, and an electric portion arranged in the motor axis direction faces one side in the rotary machine axial direction, the pump portion and the motor portion of the oil pump are caused to penetrate through a through-hole of the wall and disposed in the casing of the rotary machine, and the electric portion is disposed in the casing of the inverter.

Advantageous Effects of Invention

According to the present invention, there is an excellent effect that installation workability of an oil pump system can be improved and occurrence of a communication error between an inverter and an electric portion of an oil pump due to entry of noise can be suppressed.

DESCRIPTION OF EMBODIMENTS

Hereinafter, an embodiment of a motor system as a rotary machine system to which the present invention is applied will be described with reference to each drawing.

Figure 1:
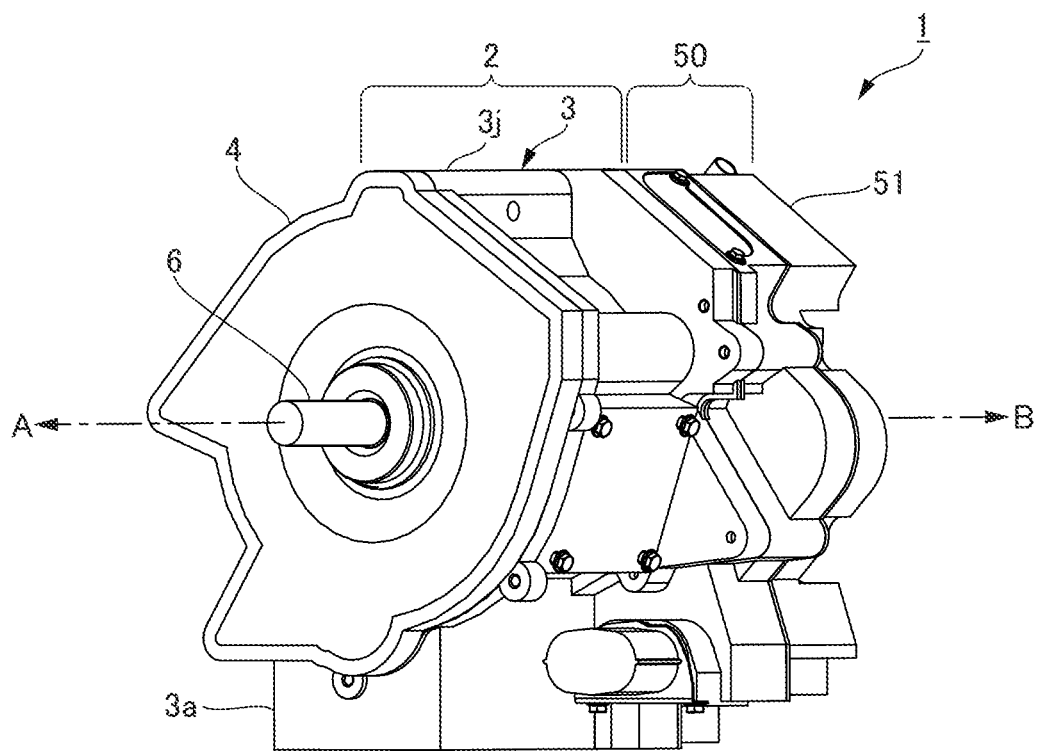
FIG. 1 is a perspective view illustrating a motor system according to an embodiment.
Figure 2:
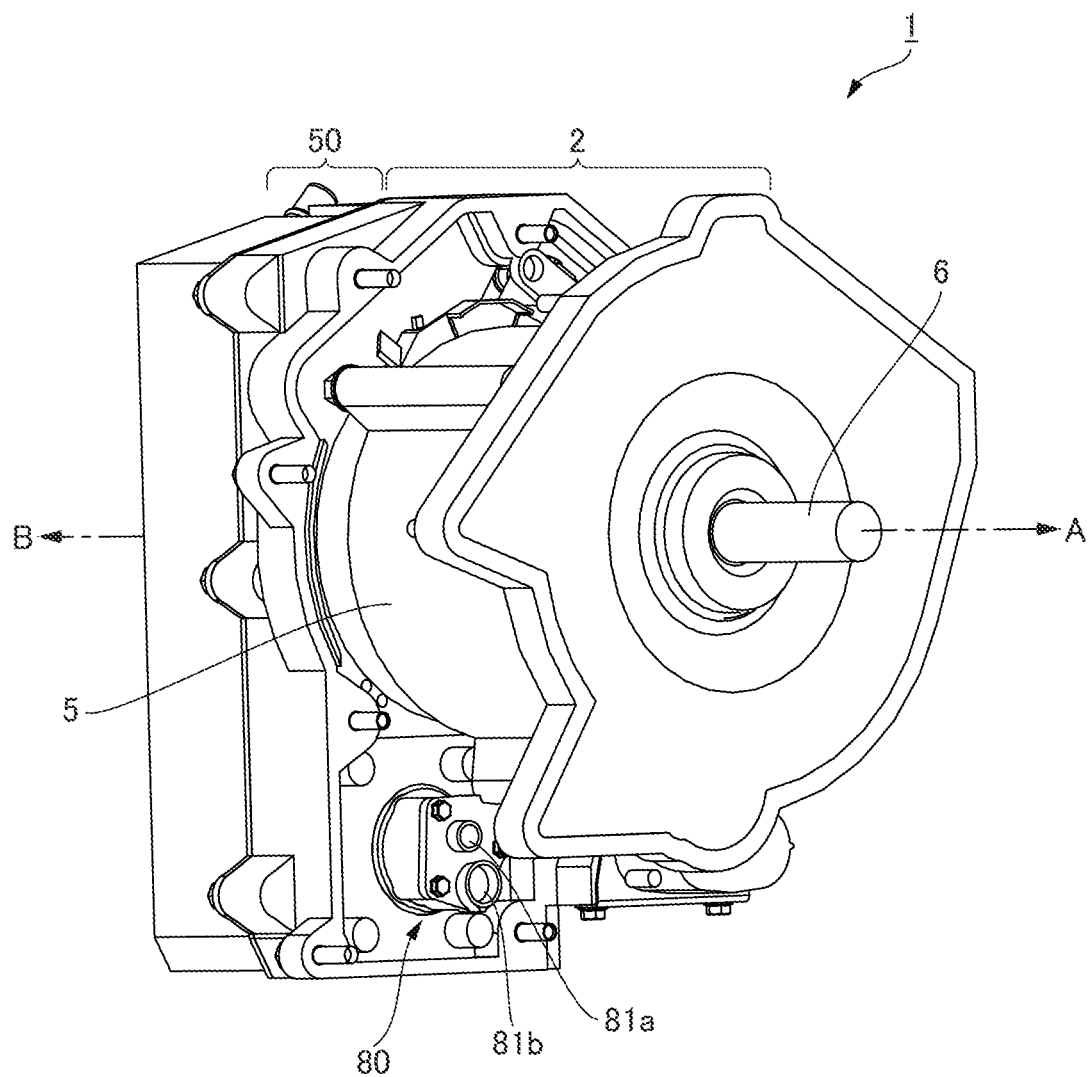
FIG. 2 is a perspective view illustrating the motor system from an angle different from that in FIG. 1 in a state where a first housing is removed.
Figure 3:
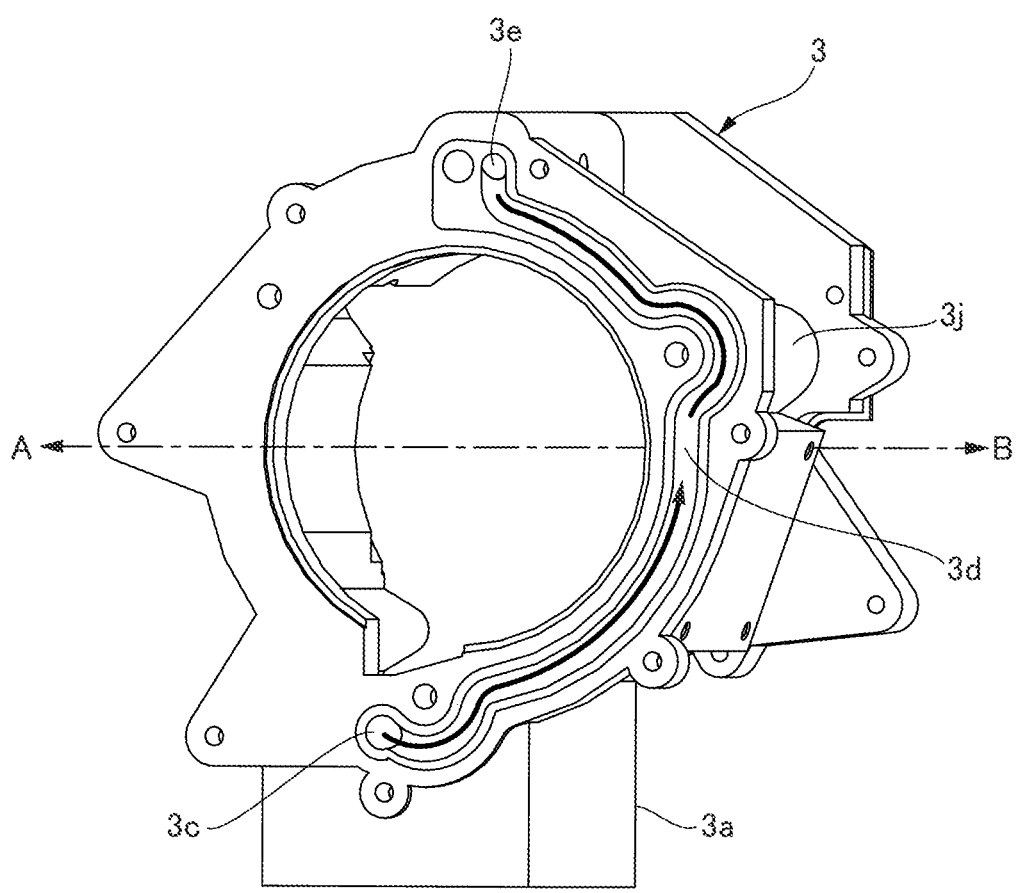
FIG. 3 is a perspective view illustrating a housing of the motor system.

FIG. 1 is a perspective view illustrating a motor system 1 according to an embodiment. FIG. 2 is a perspective view illustrating the motor system 1 from an angle different from that in FIG. 1 in a state where a first housing to be described below is removed. FIG. 3 is a perspective view illustrating a housing 3.

The motor system 1 includes a motor portion 2, an inverter 50, and an electric oil pump 80 illustrated in FIG. 2. The motor portion 2 includes the housing 3 made of a cast product, a motor cover 4, a stator 5, a rotor, which is not illustrated, a shaft 6 as a rotary shaft, and the like. As illustrated in FIG. 3, the housing 3 has a hollow structure.

Note that, in addition to the motor portion 2 described above, the motor system 1 also includes a motor portion in the electric oil pump 80 described below. The motor portion of the electric oil pump will be described by the name of an internal motor in order to be clearly distinguished from the motor portion 2 described above.

The dot-dash line illustrated in each of FIGS. 1, 2, and 3 is a line segment extending straight on a central axis line of the shaft 6. The extension direction of the dot-dash line is an example of the rotary machine axial direction of the present invention. The direction of an arrow A in FIG. 1 is an example of one side in the rotary machine axial direction. Further, the direction of an arrow B in FIG. 1 is an example of an other side in the rotary machine axial direction.

Hereinafter, the radial direction around the dot-dash line (rotary machine axis line) is simply referred to as the radial direction. Further, the circumferential direction around the dot-dash line is simply referred to as the circumferential direction.

A portion of the housing 3 on the arrow A direction side is a motor housing that accommodates the stator 5, the rotor, the shaft 6, and the like illustrated in FIG. 2 in a hollow space. Further, a portion of the housing 3 on the arrow B direction side is an inverter housing that accommodates electric components and the like of the inverter 50.

As illustrated in FIG. 3, the housing 3 has an opening at each of an end in the direction of the arrow A (one side) and an end in the direction of the arrow B (the other side). The opening at the end in the direction of the arrow A is closed by the motor cover 4 having a flat shape illustrated in FIG. 1.

The housing 3 has generally a cylindrical shape, and includes an oil storage portion 3a having a box shape protruding in the radial direction from the peripheral wall of a cylindrical portion 3j in the motor housing (a portion of the housing 3 on the arrow A direction side). The motor housing and the oil storage portion 3a communicate with each other. As illustrated in FIG. 1, the motor system 1 is designed on the premise that it is installed in such a position that the shaft 6 extends in a horizontal direction and the oil storage portion 3a faces downward in a vertical direction. Therefore, the oil in the motor housing of the housing 3 flows into and is stored in the oil storage portion 3a by gravity.

Figure 4:
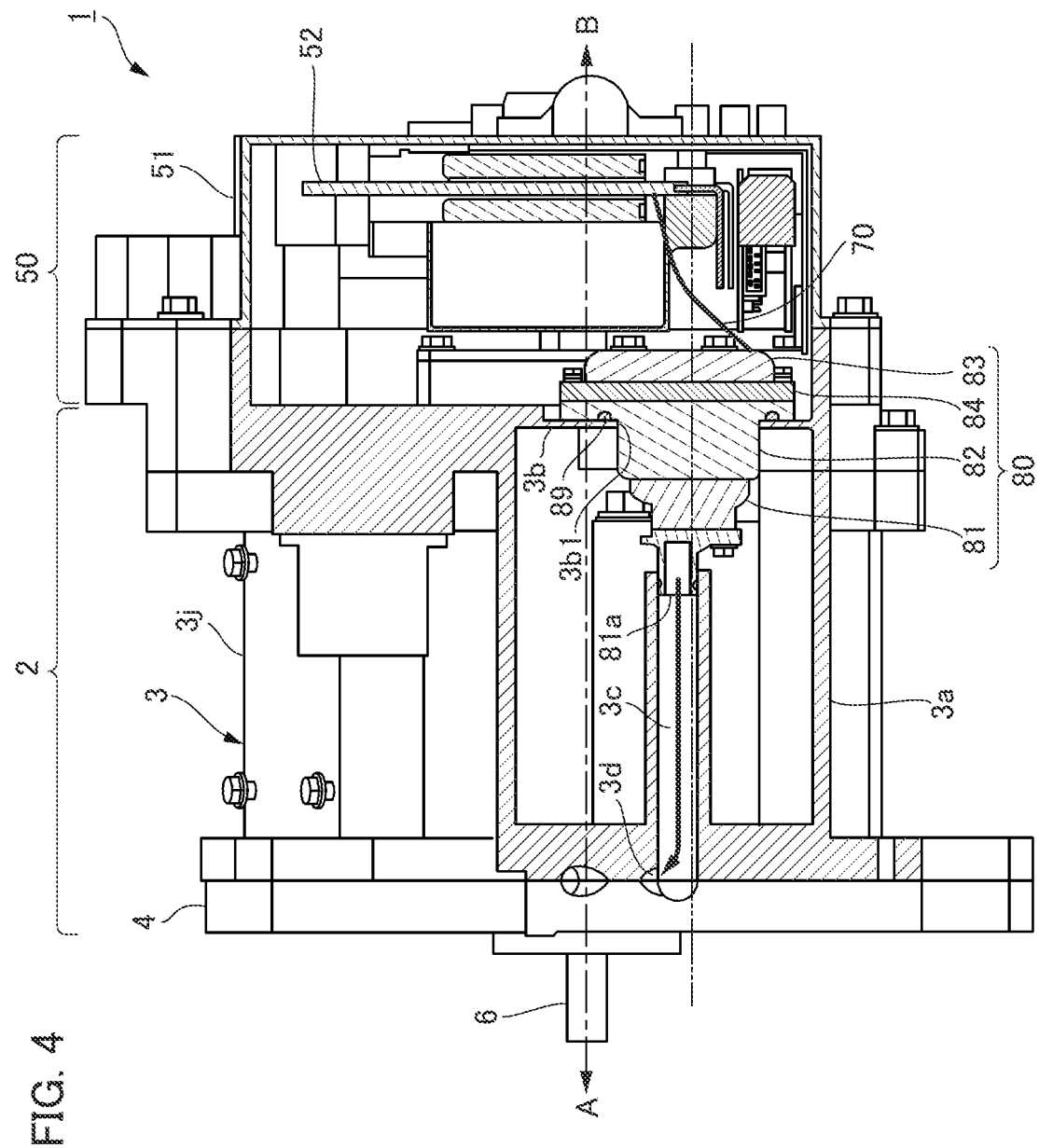
FIG. 4 is a cross-sectional view illustrating the motor system in a state of being cutaway at a position of an electric oil pump.

FIG. 4 is a cross-sectional view illustrating the motor system 1 in a state of being cutaway at a position of the electric oil pump 80. Note that, in FIG. 4, illustration of the internal structure of the electric oil pump 80 is omitted for the sake of easy understanding. According to a command sent from a higher-level device such as an engine control unit (ECU) of a vehicle, the inverter 50 supplies electric power of a three-phase power supply to the motor portion 2 at a frequency based on the command. The inverter 50 includes the above-described inverter housing (arrow B direction side of the cylindrical portion 3j), an inverter cover 51 having a hollow structure made of a cast product, and a control board 52.

The electric oil pump 80 includes a pump portion 81, an internal motor 82 serving as a drive source for rotation of an inner rotor disposed in the pump portion 81, a flange portion 84, and an electric portion 83. The double-dot-dash line illustrated in FIG. 4 is a motor axis line of the internal motor 82. The pump portion 81, the internal motor 82, the flange portion 84, and the electric portion 83 included in the electric oil pump 80 are disposed in order along the motor axis line direction (extension direction of the double-dot-dash line). An electronic board is accommodated in the electric portion 83. A communication line or the like for communicating a control signal of the inverter 50 and information such as of occurrence of abnormality of the electric oil pump is connected to the electronic board between the electronic board and the inverter 50.

The motor portion 2 and the inverter 50 are adjacent to each other in the extension direction of the shaft 6 of the motor portion 2 (the rotary machine axial direction). At the adjacent portion, a wall at an end of the inverter housing (a portion of the housing 3 on the arrow B direction side) in the direction of the arrow A (one side) and a wall at an end of the housing (casing) 3 of the motor portion 2 in the direction of the arrow B (the other side) are shared as a barrier 3b made of the same member. The electric oil pump 80 is disposed in the motor housing (a portion of the housing 3 on the arrow A direction side) and the inverter housing (casing) in a position that a pump portion 81 side of the internal motor 82 in the motor axis line direction (extension direction of the double-dot-dash line) faces the direction of the arrow A (one side).

The pump portion 81 includes a discharge port 81a for discharging oil. The discharge port 81a of the pump portion 81 communicates with a first oil passage 3c provided in the motor housing (a portion of the housing 3 on the arrow A direction side). The oil discharged through the discharge port 81a flows in the direction of the arrow A in the first oil passage 3c disposed along the extension direction of the shaft 6. The first oil passage 3c communicates with a second oil passage 3d at an end portion in the direction of the arrow A.

As illustrated in FIG. 3, the first oil passage 3c is provided at a lower end portion of the motor housing (a portion of the housing 3 on the arrow A direction side). The second oil passage 3d is formed in an outer wall of the housing 3 at an end in the direction of the arrow A, and extends over about half the circumference along the circumferential direction. An upper end portion of the second oil passage 3d communicates with a third oil passage 3e. The third oil passage 3e extends along the extension direction of the shaft 6 at an upper end portion of the motor housing. The oil flowing from the first oil passage 3c into a lower end portion of the second oil passage 3d flows from the lower side to the upper side in the second oil passage 3d having a semicircumferential shape, and flows into the third oil passage 3e at the upper end portion of the motor housing.

Figure 5:
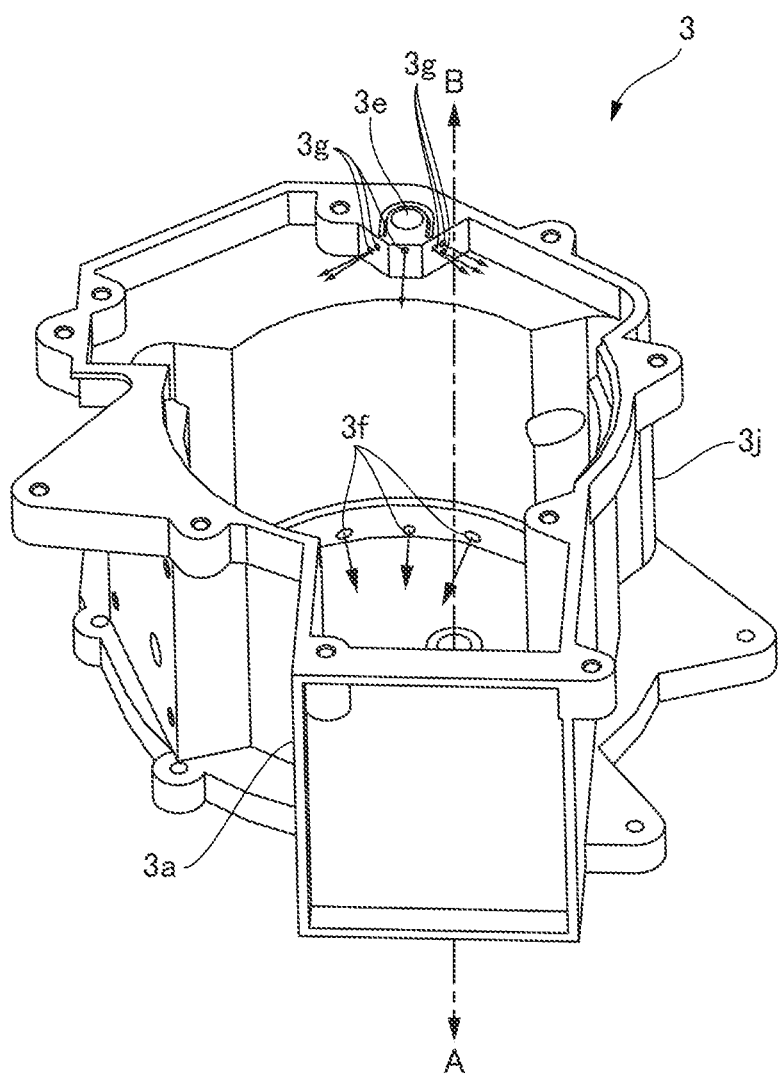
FIG. 5 is a perspective view illustrating the housing from an angle different from that in FIG. 3.

FIG. 5 is a perspective view illustrating the housing 3 from an angle different from that in FIG. 3. Three discharge ports 3f arranged along the circumferential direction are provided at an end portion on the arrow A direction side and at an upper portion in the gravity direction in the entire area of the inner circumferential surface of the cylindrical portion 3j of the housing 3. Each of the three discharge ports 3f communicates with an end portion of the third oil passage 3e on the arrow A direction side and opens downward in the gravity direction. Part of the oil flowing into the third oil passage 3e from the second oil passage (3d in FIG. 3) is discharged downward in the gravity direction through the three discharge ports 3f, and adheres to the arrow A direction side of the stator (5 in FIG. 2). Thereafter, the oil described above cools the stator while moving downward in the gravity direction over the surface of the stator (5 in FIG. 2), and then falls and is stored in the oil storage portion 3a.

The third oil passage 3e extends along the extension direction of the shaft. Another part of the oil flowing into the third oil passage 3e from the second oil passage (3d in FIG. 3) flows in the third oil passage 3e along the direction of the arrow B. Six discharge ports 3g are provided at an end portion on the arrow B direction side and at an upper portion in the gravity direction in the entire area of the inner circumferential surface of the cylindrical portion 3j of the housing 3. Each of the six discharge ports 3g communicates with an end portion of the third oil passage 3e on the arrow B direction side and opens downward in the gravity direction. The oil that has moved to the end portion of the third oil passage 3e in the direction of the arrow B is discharged downward in the gravity direction through the six discharge ports 3g, and adheres to the arrow B direction side of the stator (5 in FIG. 2). Thereafter, the oil described above cools the stator while moving downward in the gravity direction over the surface of the stator (5 in FIG. 2), and then falls and is stored in the oil storage portion 3*a*.

With the motor system 1 having such a configuration, when the motor system 1 is installed in a vehicle or the like, it is not necessary to connect the oil supply pipe and the oil discharge pipe to the motor portion 2 and the electric oil pump 80, so that installation workability of the motor system 1 can be improved. Further, in the motor system 1, as illustrated in FIG. 4, the entire area of a harness 70 connecting the electric portion 83 of the electric oil pump 80 and the control board 52 of the inverter 50 can be housed in the inverter housing and the inverter cover 51. Therefore, with the motor system 1, as compared with the conventional configuration in which a communication line is drawn outside the motor, entry of noise into the communication line of the harness 70 can be reduced, and occurrence of a communication error due to entry of noise can be suppressed. Note that the harness 70 includes a + power line, a − power line, and two communication lines.

As illustrated in FIG. 4, the electric oil pump 80 is disposed in such an aspect that the position of the motor axis line (double-dot-dash line) of the electric oil pump 80 and the position of the shaft 6 as the rotary shaft are displaced from each other in the radial direction. According to such a configuration, the size of the motor system 1 in the extension direction of the shaft 6 can be reduced as compared with a configuration in which the motor axis line of the electric oil pump 80 and the shaft are arranged on a straight line.

The pump portion 81 and the internal motor 82 in the electric oil pump 80 are disposed in the housing 3 through a through-hole 3*b*1 of the barrier 3*b*. Further, the flange portion 84 and the electric portion 83 of the electric oil pump 80 are disposed in the inverter cover 51. With such a configuration, the electric portion 83 and the control board 52 of the inverter 50 are disposed at a short distance from each other, and the length of the harness 70 connecting the electric portion 83 and the control board 52 can be shortened, so that the occurrence of a communication error due to noise entry into the communication line of the harness 70 can be more favorably suppressed.

Figure 6:
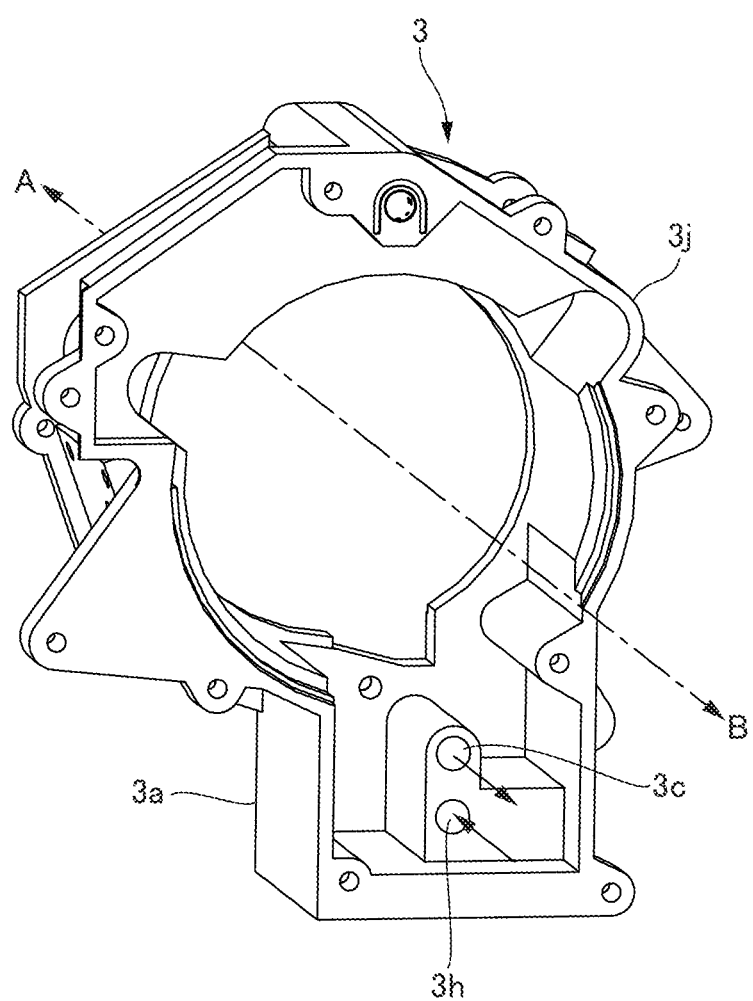
FIG. 6 is a perspective view illustrating the housing from an angle different from those in FIGS. 3 and 5.

FIG. 6 is a perspective view illustrating the housing 3 from an angle different from those in FIGS. 3 and 5. In the oil storage portion 3*a* of the housing 3, a fourth oil passage 3*h* is disposed in addition to the first oil passage 3*c*. An end of the fourth oil passage 3*h* in the direction of the arrow B opens toward the inside of the oil storage portion 3*a* as illustrated in the drawing. Further, an end portion of the fourth oil passage 3*h* in the direction of the arrow A communicates with a suction port (81*b* in FIG. 2) of the pump portion (81 in FIG. 4) of the electric oil pump (80 in FIG. 4). The oil stored in the oil storage portion 3*a* is sucked into the suction port (81*b* in FIG. 2) via the fourth oil passage 3*h*. As described above, the oil is circulated and conveyed in the motor housing (a portion of the housing 3 on the arrow A direction side).

Figure 7:
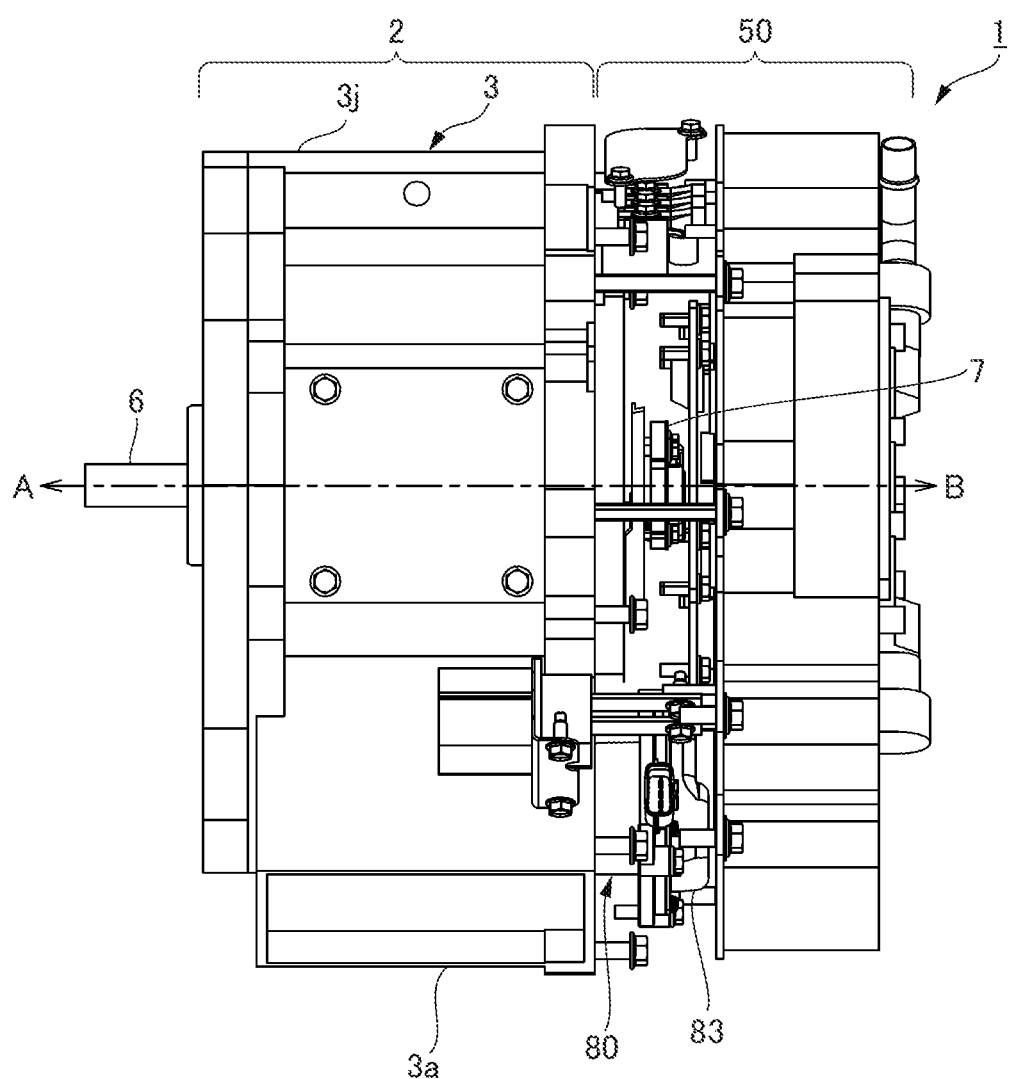
FIG. 7 is a side view illustrating the motor system in a state where an inverter housing portion of the housing is dismantled.

FIG. 7 is a side view illustrating the motor system 1 in a state where an inverter housing portion of the housing 3 is dismantled. The inverter 50 includes a rotation detection portion 7 that detects the rotation speed of the shaft 6 of the motor portion 2. The rotation detection portion 7 detects the rotation speed of the shaft 6, for example, by detecting the magnetic force of a magnet fixed to the shaft 6 using a Hall IC.

As illustrated in the drawing, the rotation detection portion 7 and the electric portion 83 of the electric oil pump 80 are disposed in an aspect of being arranged in the radial direction. A dead space is likely to occur around the rotation detection portion 7. Therefore, with the motor system 1, it is possible to reduce the size of the motor system 1 by disposing the electric portion 83 in the dead space around the rotation detection portion 7.

As illustrated in FIG. 4, the pump portion 81 and the internal motor 82 of the electric oil pump 80 are disposed in the oil storage portion 3*a* within the entire area of the inside of the motor housing (a portion of the housing 3 on the arrow A direction side). With the motor system 1 having such a configuration, the oil stored in the oil storage portion 3*a* can be efficiently sucked to the pump portion 81 disposed in the oil storage portion 3*a*, and the energy efficiency can be enhanced. Furthermore, the internal motor 82 is cooled by the oil stored in the oil storage portion 3*a*, and the temperature rise of the internal motor 82 can be suppressed.

Figure 8:
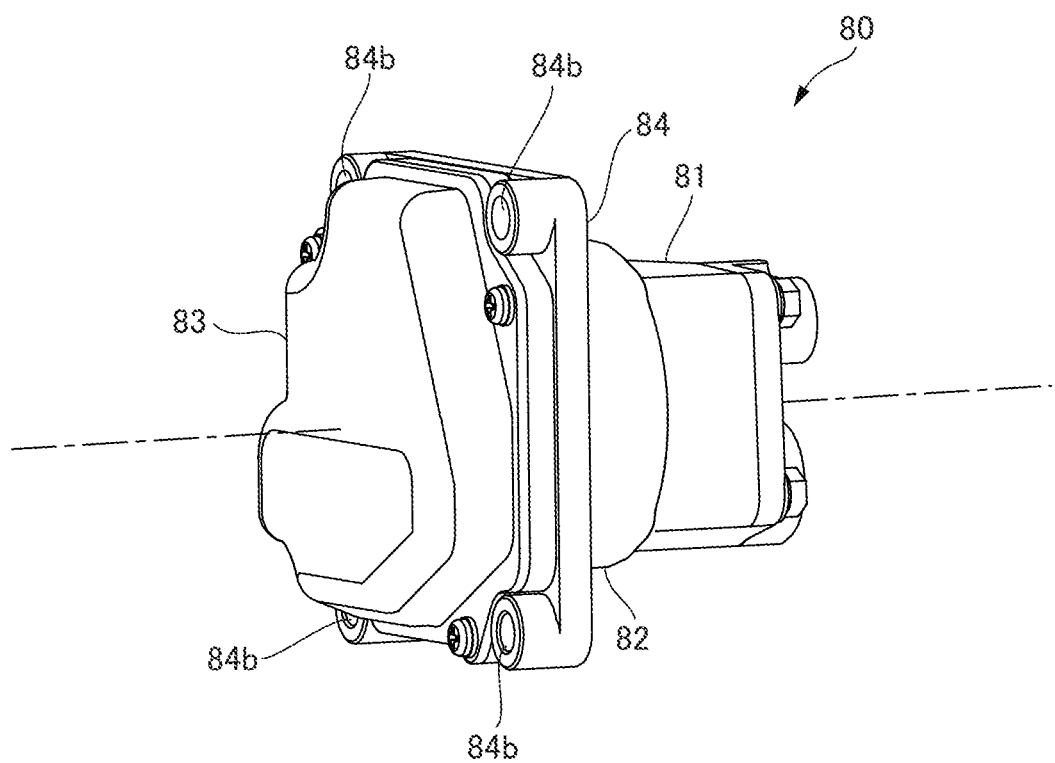
FIG. 8 is a perspective view illustrating the electric oil pump.

FIG. 8 is a perspective view illustrating the electric oil pump 80. The dot-dash line in FIG. 8 indicates the motor axis line of the electric oil pump 80. The electric oil pump 80 includes the flange portion 84 protruding in the radial direction about the motor axis line beyond the pump portion 81 and the internal motor 82 on the pump portion 81 side with respect to the electric portion 83 in the motor axis line direction.

The flange portion 84 has a flat rectangular parallelepiped shape, and has bolt holes 84*b* penetrating the flange portion 84 in the motor axis line direction at each of the four corners.

Figure 9:
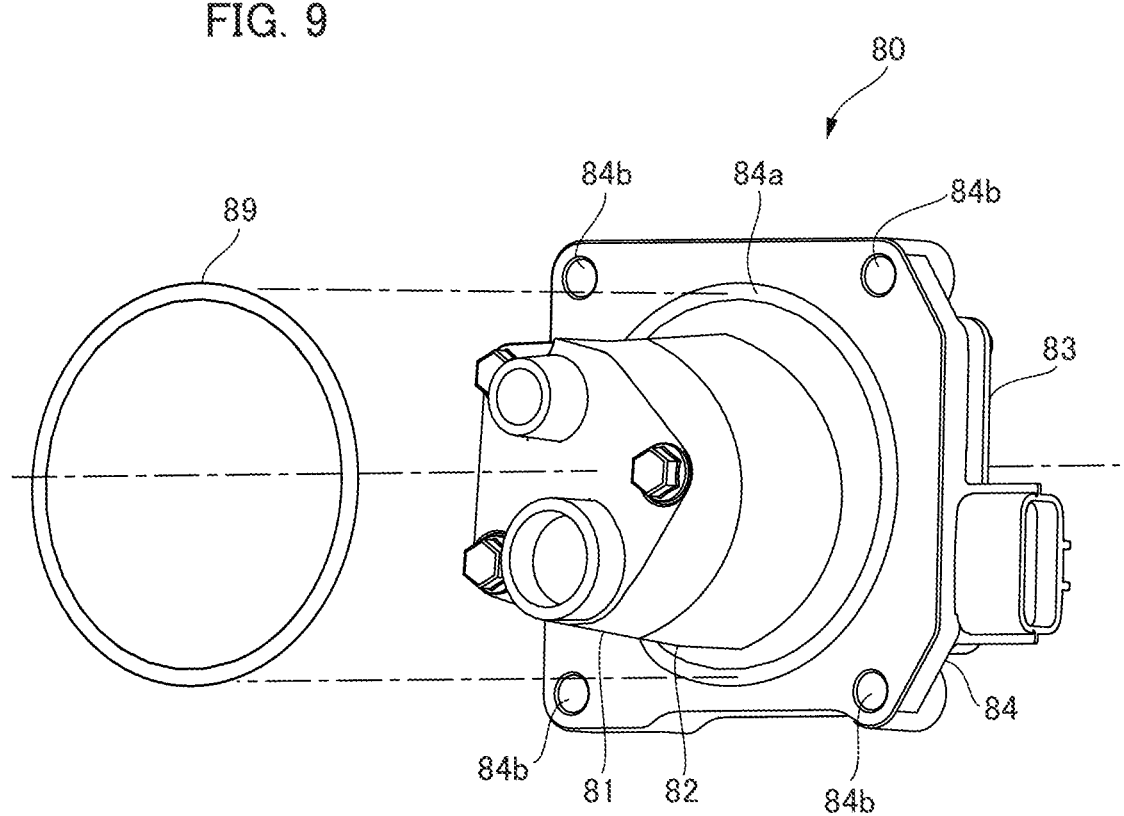
FIG. 9 is a perspective view illustrating the electric oil pump from an angle opposite to that in FIG. 8.

FIG. 9 is a perspective view illustrating the electric oil pump 80 from an angle opposite to that in FIG. 8. The flange portion 84 of the electric oil pump 80 includes a ring groove 84*a* having an annular shape on an end surface on the pump portion 81 side in the motor axis line (the dot-dash line in the drawing) direction. An O-ring 89 having an annular shape made of an elastic material such as rubber is inserted into the ring groove 84*a*.

Figure 10:
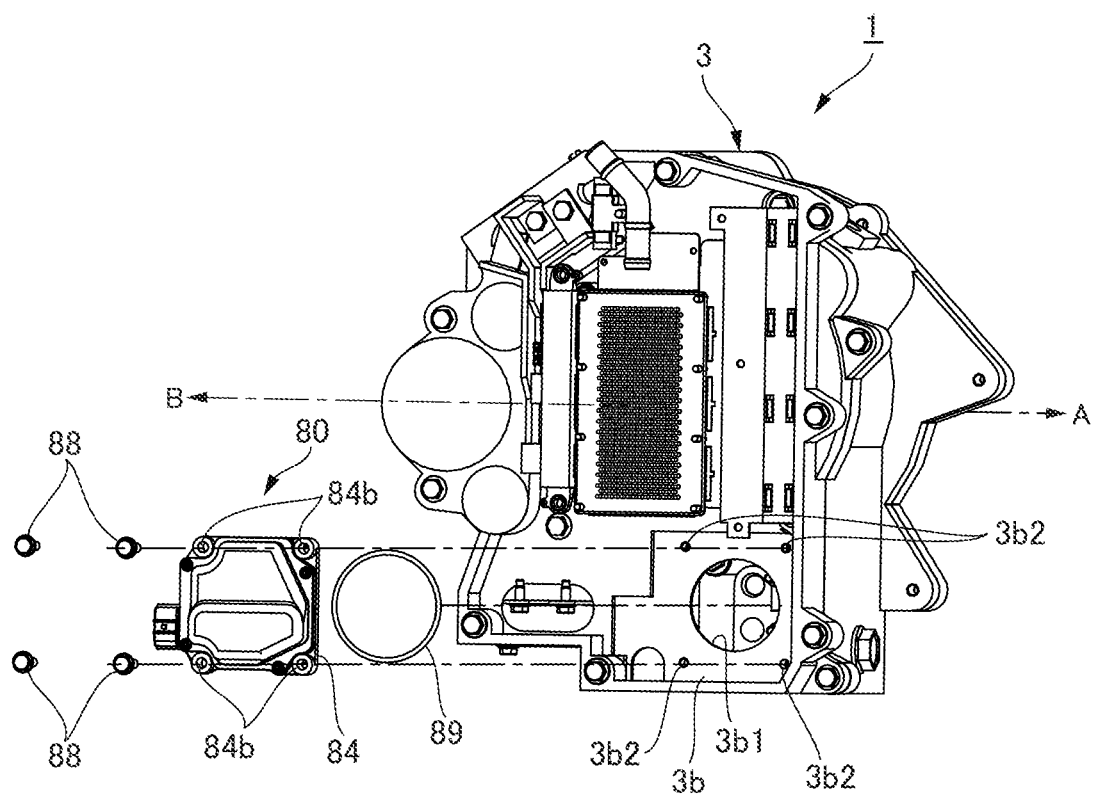
FIG. 10 is an exploded perspective view illustrating the electric oil pump in a state where an inverter cover is removed.

FIG. 10 is an exploded perspective view illustrating the electric oil pump 80 in a state where the inverter cover (51 in FIG. 4) is removed. The electric oil pump 80 includes four female screw recess portions 3*b*2 on an end surface of the barrier 3*b* of the housing 3 in the direction of the arrow B in the drawing (end surface on the other side in the rotary machine axial direction). Each of the four female screw recess portions 3*b*2 does not penetrate the barrier 3*b*.

An operator who attaches the electric oil pump 80 to the motor system 1 first causes the pump portion and the motor portion (81 and 82 in FIG. 9) of the electric oil pump 80 to pass through the through-hole 3*b*1 of the barrier 3*b* from the direction of the arrow B to the direction of the arrow A in the drawing. Next, after causing bolts 88 to pass through each of the four bolt holes 84*b* of the flange portion 84 of the electric oil pump 80, the operator fastens the bolts 88 to the female screw recess portions 3*b*2 of the barrier 3*b* to fix the electric oil pump 80 to the barrier 3*b*. In the electric oil pump 80 thus fixed, as illustrated in FIGS. 4 and 10, the O-ring 89 is interposed between the barrier 3*b* and the flange portion 84 in the axial direction of the shaft 6 (the rotary machine axial direction). Due to this interposition, the O-ring 89 prevents oil leakage from the inside of the motor housing into the inverter housing through the through-hole 3*b*1 of the barrier 3*b*. The operator can attach the electric oil pump 80 to the motor system 1 by a simple operation described below. That is, it is a simple operation in which after the O-ring 89 is set in the ring groove (84*a* in FIG. 9), the pump portion 81 and the internal motor 82 of the electric oil pump 80 pass through the through-hole 3*b*1 of the barrier 3*b*, and then the flange portion 84 is fixed to the barrier 3*b* with the bolts 88.

Note that although the example in which the ring groove 84*a* is provided on the flange portion 84 has been described, an annular groove may be provided around the through-hole 3b1 on the end surface of the barrier 3b in the direction of the arrow B (the end surface on the other side in the rotary machine axial direction).

Further, the example in which the electric oil pump 80 is disposed across both the motor housing (the portion of the housing on the arrow A direction side) and the inverter housing (the portion of the housing on the arrow B direction side) has been described, but the electric oil pump 80 may be disposed only inside the inverter housing. That is, it is sufficient if the electric portion 83 of the electric oil pump 80 is disposed in the inverter housing.

Further, although the example in which the present invention is applied to the motor system 1 including the motor portion 2 as a rotary machine has been described, the present invention may be applied to a generator system including a generator (dynamo) as a rotary machine.

The present invention is not limited to the above-described embodiment, and a configuration different from the embodiment can be adopted within a range where the configuration of the present invention can be applied. The present invention has unique operations and effects for each aspect described below.

[First Aspect]

A rotary machine system (for example, a motor system 1) including a rotary machine (for example, a motor portion 2), an inverter (for example, an inverter 50) that supplies electric power to the rotary machine, and an oil pump (for example, an electric oil pump 80) that sucks and discharges oil circulated in the rotary machine, in which the rotary machine and the inverter are adjacent to each other in a rotary machine axial direction, at an adjacent portion, a wall of the casing (for example, an inverter housing) of the inverter on one side (for example, an arrow A direction side) in the rotary machine axial direction and a wall of the casing (for example, a motor housing) of the rotary machine on an other side (for example, an arrow B direction side) in the rotary machine axial direction are shared as the same member (a barrier 3b), in a position that a pump portion side in a motor axis line direction of the oil pump (for example, the electric oil pump 80) including a pump portion (for example, a pump portion 81), a motor portion (for example, an internal motor 82), and an electric portion (for example, an electric portion 83) arranged in the motor axis line direction faces one side in the rotary machine axial direction, the electric portion of the oil pump is disposed in the casing of the inverter.

In the first aspect of such a configuration, the entire oil pump can be disposed in the casing of the inverter or across the casing of the rotary machine and the casing of the inverter. With such a configuration, all pipes for circulating the oil in the casing of the rotary machine can be accommodated in the casing of the rotary machine, or both in the casing of the rotary machine and in the casing of the inverter, and therefore, it is not necessary to connect an external pipe to the casing of the rotary machine or the casing of the inverter. Therefore, according to the first aspect, when the rotary machine system is installed in a vehicle or the like, it is possible to eliminate the time and effort of connecting the oil supply pipe and the oil discharge pipe to the rotary machine and the oil pump, so that installation workability of the rotary machine system can be improved. Further, in the first aspect, the entire area of the communication line connecting the electric portion of the oil pump and the control board of the inverter can be housed in the casing of the inverter. Therefore, according to the first aspect, as compared with the conventional configuration in which a communication line is drawn outside the motor, entry of noise into the communication line can be reduced, and occurrence of a communication error due to entry of noise can be suppressed.

[Second Aspect]

The second aspect includes the configuration of the first aspect. Further, according to the second aspect, the oil pump is disposed in an aspect that the position of a motor axis line of the oil pump and the position of a rotary shaft (for example, a shaft 6) of the rotary machine are displaced from each other in a radial direction of the rotary machine.

According to the second aspect of such a configuration, the size of the rotary machine system in a rotary machine axis line direction can be reduced as compared with a configuration in which the motor axis line of the oil pump and the rotary shaft of the rotary machine are arranged on a straight line.

[Third Aspect]

The third aspect includes the configuration of the second aspect. Further, in the third aspect, the pump portion and the motor portion of the oil pump are caused to penetrate through a through-hole (for example, a through-hole 3b1) of the wall (for example, a barrier 3b) and disposed in the casing of the rotary machine, and the electric portion is disposed in the casing of the inverter.

According to the third aspect of such a configuration, the electric portion and the control board of the inverter are disposed at a short distance from each other, and the length of the communication line connecting the electric portion and the control board can be shortened, so that the occurrence of a communication error due to noise entry into the communication line can be more favorably suppressed.

[Fourth Aspect]

The fourth aspect includes the configuration of the third aspect. Further, according to the fourth aspect, in the oil pump, a flange portion that protrudes in a radial direction about the motor axis line beyond the pump portion and the motor portion is provided on the pump portion side in the motor axis line direction with respect to the electric portion, a groove having an annular shape (for example, a ring groove 84a) is provided on an end surface of the flange portion on the pump portion side in the motor axis line direction or around the through-hole on an end surface of the wall on the other side in the rotary machine axial direction, and a sealing member having an annular shape (for example, an O-ring 89) disposed in the groove is interposed between the wall and the flange portion in the rotary machine axial direction.

According to the fourth aspect, oil leakage from the inside of the rotary machine to the inside of the inverter through the through-hole of the wall can be prevented by the sealing member having an annular shape, which is a simple configuration. Further, according to the fourth aspect, the oil pump can be attached to the rotary machine by a simple operation of setting the sealing member in the groove having an annular shape, causing the pump portion and the motor portion of the oil pump to pass through the through-hole of the wall, and then fixing the flange portion to the wall with bolts or the like.

[Fifth Aspect]

The fifth aspect includes the configuration of any one of the second to fourth aspects. Further, according to the fifth aspect, a rotation detection portion (for example, a rotation detection portion 7) that detects the rotation speed of the rotary machine and the electric portion of the oil pump are disposed side by side in the radial direction of the rotary machine.

According to the fifth aspect of such a configuration, it is possible to reduce the size of the rotary machine system by disposing the electric portion in the dead space around the rotation detection portion.

[Sixth Aspect]

The sixth aspect includes the configuration of any one of the second to fifth aspects. Further, according to the fourth aspect, the pump portion and the motor portion are disposed in an oil storage portion (for example, an oil storage portion 3a) in the casing of the rotary machine.

According to the sixth aspect of such a configuration, the oil stored in the oil storage portion can be efficiently sucked to the pump portion disposed in the oil storage portion, and the energy efficiency can be enhanced. Furthermore, the motor portion of the oil pump is cooled by the oil stored in the oil storage portion, and the temperature rise of the motor portion can be suppressed.

The present application claims priorities based on Japanese Patent Application No. 2020-004886 filed on Jan. 16, 2020 and Japanese Patent Application No. 2020-15457 filed on Jan. 31, 2020, and the entire contents of which are incorporated herein by reference.

REFERENCE SIGNS LIST

1 Motor system (rotary machine system)
2 Motor portion (rotary machine)
3 Housing (casing of rotary machine, casing of inverter)
3a Oil storage portion
3b Barrier (shared wall)
3b1 Through-hole
4 Motor cover
5 Stator
6 Shaft (rotary shaft)
7 Rotation detection portion
50 Inverter
51 Inverter cover (casing)
52 Control board
70 Harness
80 Electric oil pump
81 Pump portion
82 Motor portion
83 Electric portion
84 Flange portion
84a Annular groove
89 O-ring (annular sealing member)

The invention claimed is:

1. A rotary machine system comprising:
a rotary machine; an inverter configured to supply electric power to the rotary machine; and an oil pump configured to suck and discharge oil circulated in the rotary machine, wherein
the rotary machine and the inverter are adjacent to each other in a rotary machine axial direction,
at an adjacent portion, a shared wall forms a portion of a casing of the inverter on one side in the rotary machine axial direction and the shared wall forms a portion of a casing of the rotary machine on another side in the rotary machine axial direction, and
the oil pump includes a pump portion, a motor portion, and an electric portion arranged in a motor axis line direction, wherein the pump portion and the motor portion of the oil pump are disposed to penetrate through a through-hole of the shared wall and are disposed in the casing of the rotary machine, and the electric portion is disposed in the casing of the inverter.

2. The rotary machine system according to claim 1, wherein
the oil pump is positioned such that a motor axis line of the oil pump and an axis of a rotary shaft of the rotary machine are displaced from each other in a radial direction of the rotary machine.

3. The rotary machine system according to claim 2, wherein
a rotation detection portion that detects a rotation speed of the rotary machine and the electric portion of the oil pump are disposed side by side in the radial direction of the rotary machine.

4. The rotary machine system according to claim 2, wherein
the pump portion and the motor portion are disposed in an oil storage portion in the casing of the rotary machine.

5. The rotary machine system according to claim 2, wherein the motor axis line of the oil pump is parallel to the axis of the rotary shaft of the rotary machine.

6. A rotary machine system comprising:
a rotary machine;
an inverter configured to supply electric power to the rotary machine; and
an oil pump configured to suck and discharge oil circulated in the rotary machine, wherein
the rotary machine and the inverter are adjacent to each other in a rotary machine axial direction,
at an adjacent portion, a shared wall forms a portion of a casing of the inverter on one side in the rotary machine axial direction and the shared wall forms a portion of a casing of the rotary machine on another side in the rotary machine axial direction,
the oil pump includes a pump portion, a motor portion, and an electric portion arranged in a motor axis line direction, wherein the pump portion and the motor portion of the oil pump are disposed to penetrate through a through-hole of the shared wall and are disposed in the casing of the rotary machine, and the electric portion is disposed in the casing of the inverter,
the oil pump is positioned such that a motor axis line of the oil pump and an axis of a rotary shaft of the rotary machine are displaced from each other in a radial direction of the rotary machine,
in the oil pump, a flange portion that protrudes in the radial direction about the motor axis line beyond the pump portion and the motor portion is provided on the pump portion side in the motor axis line direction with respect to the electric portion,
a groove having an annular shape is provided on an end surface of the flange portion on the pump portion side in the motor axis line direction or around the through-hole on an end surface of the shared wall on the other side in the rotary machine axial direction, and
a sealing member having an annular shape disposed in the groove is interposed between the shared wall and the flange portion in the rotary machine axial direction.

* * * * *